(12) United States Patent
Kim et al.

(10) Patent No.: US 11,531,509 B2
(45) Date of Patent: Dec. 20, 2022

(54) AUTOMATIC SCROLL CONTROL METHOD FOR SYNCHRONIZING POSITIONS OF ORIGINAL TEXT AND TRANSLATION, COMPUTER PROGRAM AND TERMINAL DEVICE

(71) Applicant: NAVER CORPORATION, Seongnam-si (KR)

(72) Inventors: Yeongje Kim, Seongnam-si (KR); Hanno Lee, Seongnam-si (KR); Byungsoo Kim, Seongnam-si (KR); Jihyun Hwang, Seongnam-si (KR); Jung Hee Baek, Seongnam-si (KR); Jinah Park, Seongnam-si (KR); Eunbi Joe, Seongnam-si (KR); Hyoung Jung Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

(21) Appl. No.: 17/150,258

(22) Filed: Jan. 15, 2021

(65) Prior Publication Data
US 2021/0224013 A1 Jul. 22, 2021

(30) Foreign Application Priority Data
Jan. 16, 2020 (KR) ........................ 10-2020-0006014

(51) Int. Cl.
*G06F 3/14* (2006.01)
*G06F 1/16* (2006.01)
(Continued)

(52) U.S. Cl.
CPC .......... *G06F 3/1423* (2013.01); *G06F 1/1647* (2013.01); *G06F 3/0485* (2013.01);
(Continued)

(58) Field of Classification Search
CPC ........ G06F 3/1423; G06F 40/47; G06F 40/58; G06F 1/1647; G06F 3/147; G06F 3/0485; G06F 3/0486; G06F 40/40
See application file for complete search history.

(56) References Cited

U.S. PATENT DOCUMENTS

2005/0030279 A1* 2/2005 Fu ....................... G06F 3/03543
345/156
2011/0246175 A1* 10/2011 Yi ............................ G06F 40/45
704/3
(Continued)

FOREIGN PATENT DOCUMENTS

JP 61223978 A 10/1986
JP 01103774 A 4/1989
(Continued)

OTHER PUBLICATIONS

Office action issued in corresponding Korean patent application No. 10-2020-0006014, dated Apr. 12, 2021.
(Continued)

*Primary Examiner* — Pei Yong Weng
(74) *Attorney, Agent, or Firm* — Greer Burns & Crain Ltd.

(57) ABSTRACT

An automatic scroll control method for synchronizing positions of an original text and a translation includes displaying, by a processor of a terminal device, the original text on a first display and displaying the translation corresponding to the original text on a second display; and when the original text or the translation is scrolled by a drag operation of a user, synchronizing the display positions of the original text and the translation with each other.

13 Claims, 8 Drawing Sheets

(51) Int. Cl.
  *G06F 3/147* (2006.01)
  *G06F 3/0485* (2022.01)
  *G06F 40/58* (2020.01)
  *G06F 40/47* (2020.01)

(52) U.S. Cl.
  CPC .............. *G06F 3/147* (2013.01); *G06F 40/47* (2020.01); *G06F 40/58* (2020.01)

(56) References Cited

U.S. PATENT DOCUMENTS

| | | | |
|---|---|---|---|
| 2011/0313755 | A1 | 12/2011 | Oh |
| 2013/0282360 | A1* | 10/2013 | Shimota .................. G06F 40/58 704/7 |
| 2015/0127320 | A1 | 5/2015 | Seo et al. |
| 2015/0347389 | A1* | 12/2015 | Lee ....................... G06F 40/242 704/2 |

FOREIGN PATENT DOCUMENTS

| | | |
|---|---|---|
| JP | 2000268037 A | 9/2000 |
| JP | 2004046841 A | 2/2004 |
| JP | 2005222136 A | 8/2005 |
| JP | 20150225659 A | 12/2015 |
| JP | 2018120479 A | 8/2018 |
| KR | 1020100091923 A | 8/2010 |
| KR | 1020150050947 A | 5/2015 |

OTHER PUBLICATIONS

Office action issued in corresponding Japanese patent application No. 2021-00487, dated Dec. 14, 2021.

Notice of Allowance issued in corresponding JP application No. 2021-00487, dated Aug. 30, 2022.

\* cited by examiner

AUTOMATIC SCROLL CONTROL METHOD FOR SYNCHRONIZING POSITIONS OF ORIGINAL TEXT AND TRANSLATION, COMPUTER PROGRAM AND TERMINAL DEVICE

CROSS-REFERENCE TO RELATED APPLICATIONS

This application claims priority to Korean Patent Application No. 10-2020-0006014 filed on Jan. 16, 2020 in the Korean Intellectual Property Office, the entire contents of which are hereby incorporated by reference in their entirety.

BACKGROUND OF THE INVENTION

Field of Invention

The present invention relates to an automatic scroll control for synchronizing the positions of an original text and its translation on two display screens.

Description of Related Art

In recent years, mobile devices with a dual display or foldable mobile devices in which two screens can be used by virtually dividing one display into two areas have been provided.

On the other hand, a web browser or an application including a function to translate an original text in a first language into a second language is provided. When the web browser or the application having the translation function is executed in a mobile device having a dual display or two screens, the original text is displayed on the first display or first screen and the translation corresponding to the original text is displayed on the second display or second screen.

However, since lengths of the original text and the translation are different from each other, a case where the original text and the translation displayed on both sides of the screen are not displayed at positions corresponding to each other frequently occurs. Further, when a user scrolls the original text displayed in the first display by performing a drag operation, the translation displayed in the second display is not accordingly scrolled or, even though the translation is scrolled, since the lengths of the original text and the translation are different from each other, display positions of the original text and the translation are different from each other. As a result, the user cannot easily view the translation corresponding to the original text, There may even be a case where a sentence of the original text may be displayed on the first display, but a sentence of the corresponding translation is not displayed on the second display.

BRIEF SUMMARY OF THE INVENTION

The present invention has been made in an effort to provide an automatic scroll control method for synchronizing positions of an original text and its translation. The method allows a user to easily view contents corresponding to each other by synchronizing the positions of the original text and the translation.

The present invention has also been made in an effort to provide a computer program which allows a user to easily view contents corresponding to each other by synchronizing positions of an original text and a translation.

The present invention has also been made in an effort to provide a terminal device which allows a user to easily view contents corresponding to each other by synchronizing positions of an original text and a translation.

An exemplary embodiment of the present invention provides an automatic scroll control method for synchronizing positions of an original text and a translation, including: displaying, by a processor of a terminal device, an original text on a first display and displaying a translation corresponding to the original text on a second display; and when the original text or the translation is scrolled by a drag operation of a user, synchronizing, by the processor, display positions of the original text and the translation with each other.

Another exemplary embodiment of the present invention provides a terminal device including: a display control unit displaying an original text on a first display and displaying a translation corresponding to the original text on a second display; and a scroll synchronization unit synchronizing display positions of the original text and the translation with each other when the original text or the translation is scrolled by a drag operation of a user.

Still another exemplary embodiment of the present invention provides a terminal device including: a processor; and a memory connected to the processor, in which the memory includes one or more modules configured to be executed by the processor, the one or more modules may include commands for displaying an original text on a first display and displaying a translation corresponding to the original text on a second display and synchronizing display positions of the original text and the translation with each other when the original text or the translation is scrolled by a drag operation of a user.

The technical solution above does not list all features of the present invention. Various features of the present invention and advantages and effects according thereto will be understood in more detail with reference to specific embodiments below.

According to an exemplary embodiment of the present invention, since the locations of the original text and the translation are synchronized with each other by an automatic scroll control, when a user scrolls the original text and the translation, the original text and the translation which are not scrolled are automatically scrolled. Also even though the lengths of the original text and the translation are different from each other, since respective scroll speeds are controlled so that the positions of the original text and the translation are synchronized with each other, the positions of the original text and the translation corresponding thereto are synchronized with each other. As a result, a user can conveniently compare the original text and the translation while scrolling the original text and the translation with one hand.

When the user scrolls the original text displayed in a first display by performing a drag operation, since the translation displayed in a second display is scrolled according to scrolling of the original text, the original text and the translation corresponding thereto can be continuously displayed at positions corresponding to each other in the first display and the second display.

The user may perform a simple flicking operation to allow the user to locate a specific paragraph of the original text desired by the user and the paragraph of the corresponding original text on a reference line set at a predetermined position to quickly compare the desired paragraph of the original text and the corresponding paragraph of the translation.

A specific sentence of the original text desired by the user and the corresponding sentence of the translation can be located quickly to compare the original text and the translation of the desired paragraph. As a result, when the specific sentence of the original text is exposed to the first display, while the sentence of the translation corresponding thereto is not exposed to the second display, the user may simply touch the specific sentence of the original text to expose the sentence of the translation corresponding to the specific sentence of the original text to a corresponding position of the second display.

Advantages which can be obtained by the automatic scroll control method for synchronizing positions of an original text and a translation, the computer program, and the terminal device according to exemplary embodiments of the present invention are not limited to the aforementioned advantages and other unmentioned advantages will be clearly understood by those skilled in the art from the following description.

DETAILED DESCRIPTION OF THE INVENTION

Figure 1:
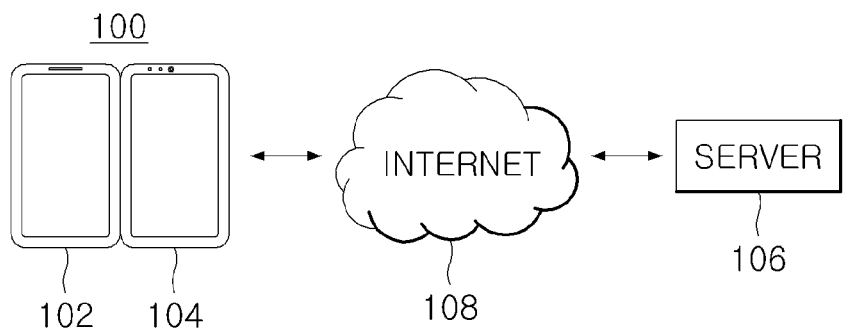
FIG. 1 is a diagram illustrating a terminal device having a dual display and a server in a system in which an automatic scroll control method for synchronizing positions of an original text and a translation is performed according to an exemplary embodiment of the present invention.

Hereinafter, exemplary embodiments disclosed in this specification will be described in detail with reference to the accompanying drawings and the same or similar components are denoted by the same reference numerals regardless of the views of the drawing, and duplicated description thereof will be omitted. The term "unit" used in the specification means software or hardware components such as FPGA or ASIC and the "unit" performs predetermined roles. However, the "unit" is not a meaning limited to software or hardware. The "unit" may be configured to reside on an addressable storage medium and may be configured to provide instructions for executing various functions of one or more processors. Accordingly, as one example, the "unit" includes components such as software components, object oriented software components, class components, and task components, processes, functions, attributes, procedures, subroutines, segments of a program code, drivers, firmware, microcodes, circuitry, data, databases, data structures, tables, arrays, and variables. Functions provided in the components and the "units" may be combined into a smaller number of components and "units" or further separated into additional components and "units".

In describing an embodiment disclosed in the present disclosure, a detailed description of related known technologies will be omitted if it is determined that the detailed description makes the gist of the embodiment of the present disclosure unclear. Further, it is to be understood that the accompanying drawings are used for easily understanding the exemplary embodiments disclosed in this specification and a technical spirit disclosed in this specification is not limited by the accompanying drawings and all changes, equivalents, or substitutes included in the spirit and the technical scope of the present invention are included.

Hereinafter, referring to the accompanying drawings, an automatic scroll control method for synchronizing positions of an original text and a translation and a terminal device according to an exemplary embodiment of the present invention will be described.

Referring to FIG. 1, a terminal device 100 may receive contents related to a desired website by accessing a server 106 through the Internet 108 by using a web browser and display the received contents on a first display 102 and translate an original text of the website into a website configured by another language by using a translation function of the web browser and display the translated website on a second display 104. As a result, the original text in a first language may be displayed on the first display 102 and a translation in a second language corresponding to the original text may be displayed on the second display 102. That is, the original text displayed on the first display 102 may be a website in the original language and the translation displayed on the second display 104 may be the same website in the translated language generated by the translation function of the web browser.

In an exemplary embodiment of the present invention, the terminal device 100 receives the contents of the website by using the web browser and displays the original text and the translation on the first and second displays 102 and 104, respectively, but the present invention is not limited thereto. In another exemplary embodiment of the present invention, the terminal device 100 may store its own contents, and the original text of the contents may be translated by a predetermined application. The original text and the translation of the original text may be displayed on the first and second displays 102 and 104, respectively.

The terminal device 100 may execute the web browser and load a webpage onto the web browser according to an input of a user. The terminal device 100 may include the first display 102 for displaying the loaded original text webpage to the user, a second display 104 for displaying the translation webpage corresponding to the original text webpage, an input unit receiving the input of the user, a memory for storing an operating system, predetermined commands and data, and a processor.

Figure 2:
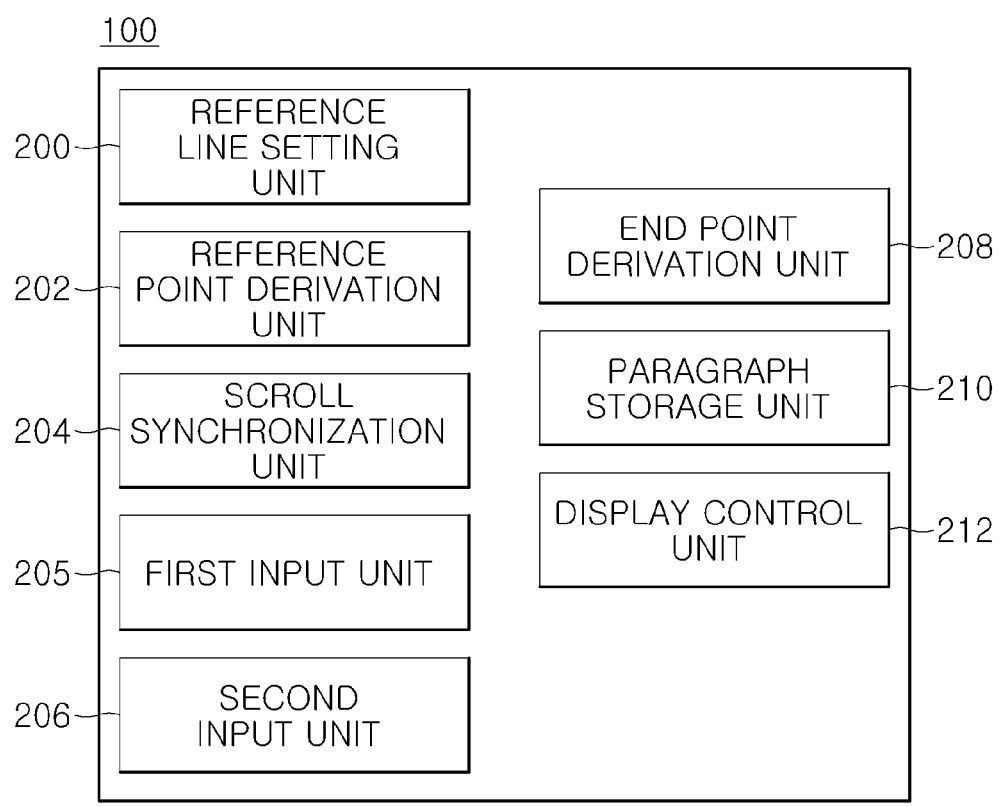
FIG. 2 is a block diagram illustrating a terminal device in which an automatic scroll control method for synchronizing positions of an original text and a translation is performed according to an exemplary embodiment of the present invention.

Referring to FIG. 2, the terminal device 100 according to an exemplary embodiment of the present invention includes a display control unit 212 for displaying the original text on the first display 102 and displaying the translation corresponding to the original text on the second display 104 and a scroll synchronization unit 204 for synchronizing display positions of the original text and the translation when the original text or the translation is scrolled by a drag operation of the user.

The terminal device 100 according to an exemplary embodiment of the present invention further includes a reference line setting unit 200 for setting reference lines 506a and 506b of FIG. 5 at predetermined positions of the first and second displays 102 and 104, a reference point derivation unit 202 for deriving a reference point of each paragraph of the translation corresponding to the original text, an end point derivation unit 208 for deriving an end point of each paragraph of the translation corresponding to the original text, a paragraph storage unit 210 for storing a paragraph of the translation corresponding to the original text acquired by the terminal device 100, a first input unit 205 provided in the first display 102 and for inputting various inputs such as a touch and a character input of the user, a second input unit 206 provided in the second display 104 and for inputting various inputs such as the touch and the character input of the user, and a display control unit 212 for displaying the original text on the first display 102 and displaying the translation corresponding to the original text on the second display 104.

Figure 3:
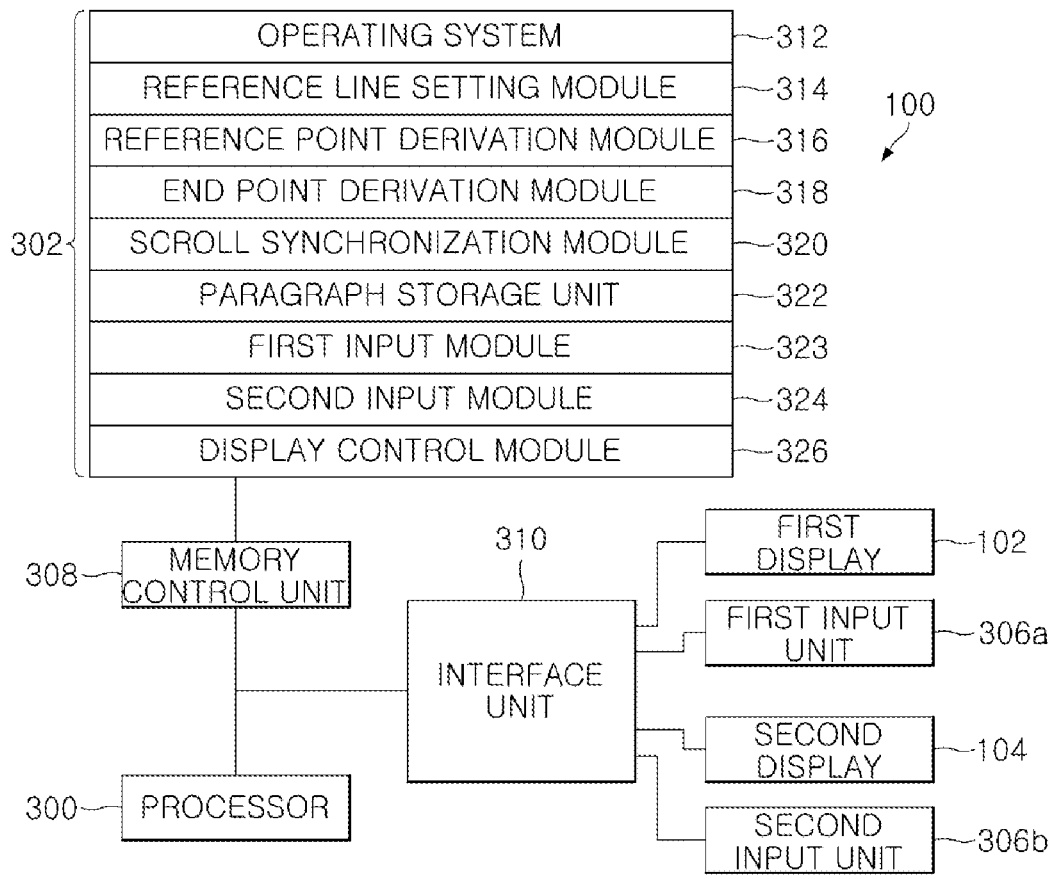
FIG. 3 is a detailed block diagram of a terminal device having a dual display in which an automatic scroll control method for synchronizing positions of an original text and a translation is performed according to an exemplary embodiment of the present invention.

Referring to FIG. 3, the terminal device 100 according to an exemplary embodiment of the present invention includes a processor 300 for controlling an operation of the terminal device 100 and a memory 302 connected to the processor 300 through a memory control unit 308.

The processor 300 may perform various functions and perform a function of processing data by executing various software programs and a set of commands stored in the memory 302.

The memory 302 may include a high-speed random access memory, one or more magnetic disk storage devices, a non-volatile memory such as a flash memory device, and the like. Further, the memory 302 may further include a storage device located away from the processor 300 or a network attached storage device accessed through a communication network such as the Internet.

The memory 302 includes one or more modules configured to be executed by the processor 300 and the one or more modules include a display control module 326 including commands for displaying the original text on the first display 102 and displaying the translation corresponding to the original text on the second display 104 and a scroll synchronization module 320 including a command for synchronizing the display positions of the original text and the translation with each other when the original text or the translation is scrolled by the drag operation of the user.

The memory 302 further includes an operating system 312 including a command for controlling an overall operation of the terminal device 100, a reference line setting module 314 including a command for setting the reference line, a reference point derivation module 316 including a command for deriving the reference point, an end point derivation module 318 including a command for deriving the end point, a paragraph storage unit 322 for storing the paragraph, a first input module 323 including a command for inputting various inputs such as the touch and the character input of the user input through a first input unit 306a, and a second input module 324 including a command for inputting various inputs such as the touch and the character input of the user input through a second input unit 306b.

The terminal device 100 according to an exemplary embodiment of the present invention further includes a first display 102 and a second display for displaying a result processed by the processor 300 and a first input unit 306a and a second input unit 306b for inputting various inputs such as the touch and the character input of the user, and an interface unit 310.

The displays 102 and 104 may be components displaying the contents of the web browser so as for the user to confirm the contents of the web browser visually. For example, the first and second displays 102 and 104 may display the contents of the web browser to the user by using a liquid crystal display, a thin film transistor-liquid crystal display, an organic light-emitting diode, a flexible display, a 3D display, an electrophoretic display, etc. However, the contents of the present invention are not limited thereto and besides, the first and second displays 102 and 104 may be implemented by various schemes.

The input units 306a and 306b receive the input from the user, and may include a keyboard, a keypad, a mouse, a touch pen, a touch pad, a touch panel, a jog wheel, a jog switch, etc.

In the terminal device 100 according to an exemplary embodiment of the present invention, the first input unit 306a is a touch screen panel provided in the first display 102 and the second input unit 306b is the touch screen panel provided in the second display 104. However, the present invention is not limited thereto and the first input unit 306a and the second input unit 306b may include various input devices including the touch pad, the touch pen, a track ball, the mouse, the keyboard, and the like.

The interface unit 310 may connect the first and second displays 102 104, and the first and second input units 306a, 306b, and other input and output peripheral devices of the terminal device 100 to the processor 300 and the memory 302, and a memory control unit 308 may perform a function of controlling a memory access when the processor 300 or a component of the computer device accesses the memory 302. According to the exemplary embodiment, the processor 300, the memory control unit 308, and the interface unit 310 may be implemented on a single chip or implemented as separate chips.

Hereinbelow, referring to FIGS. 3 to 8, an automatic scroll control method for synchronizing the positions of the original text and the translation according to an exemplary embodiment of the present invention will be described.

Figure 4A:
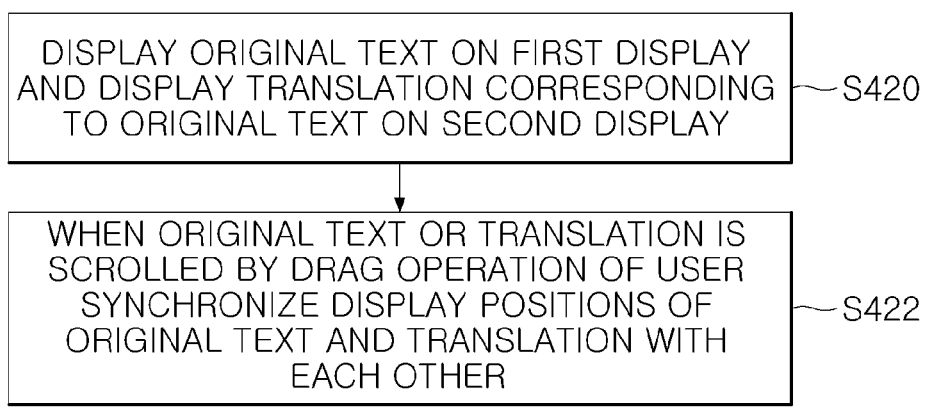
FIG. 4A is a flowchart of an automatic scroll control method for synchronizing positions of an original text and a translation according to an exemplary embodiment of the present invention.

FIG. 4A is a schematic flowchart of an automatic scroll control method for synchronizing positions of an original text and a translation according to an exemplary embodiment of the present invention.

Referring to FIG. 4A, in step S420, a processor 300 of a terminal device 100 displays an original text on the first display 102 and displays a translation corresponding to the original text on the second display 104.

Figure 5A:
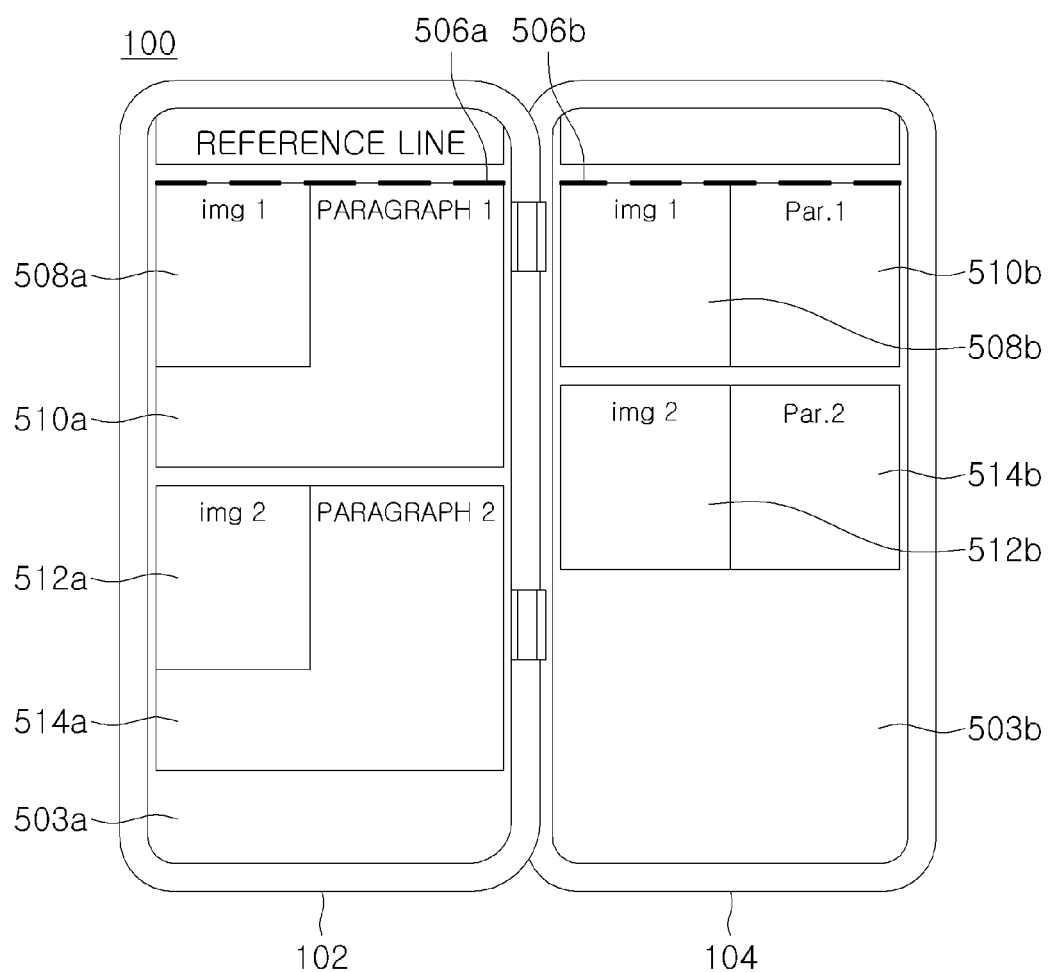
FIGS. 5A-5B, 6 and 7 are diagrams for describing an operation of an automatic scroll control method for synchronizing positions of an original text and a translation according to an exemplary embodiment of the present invention.
Figure 5B:
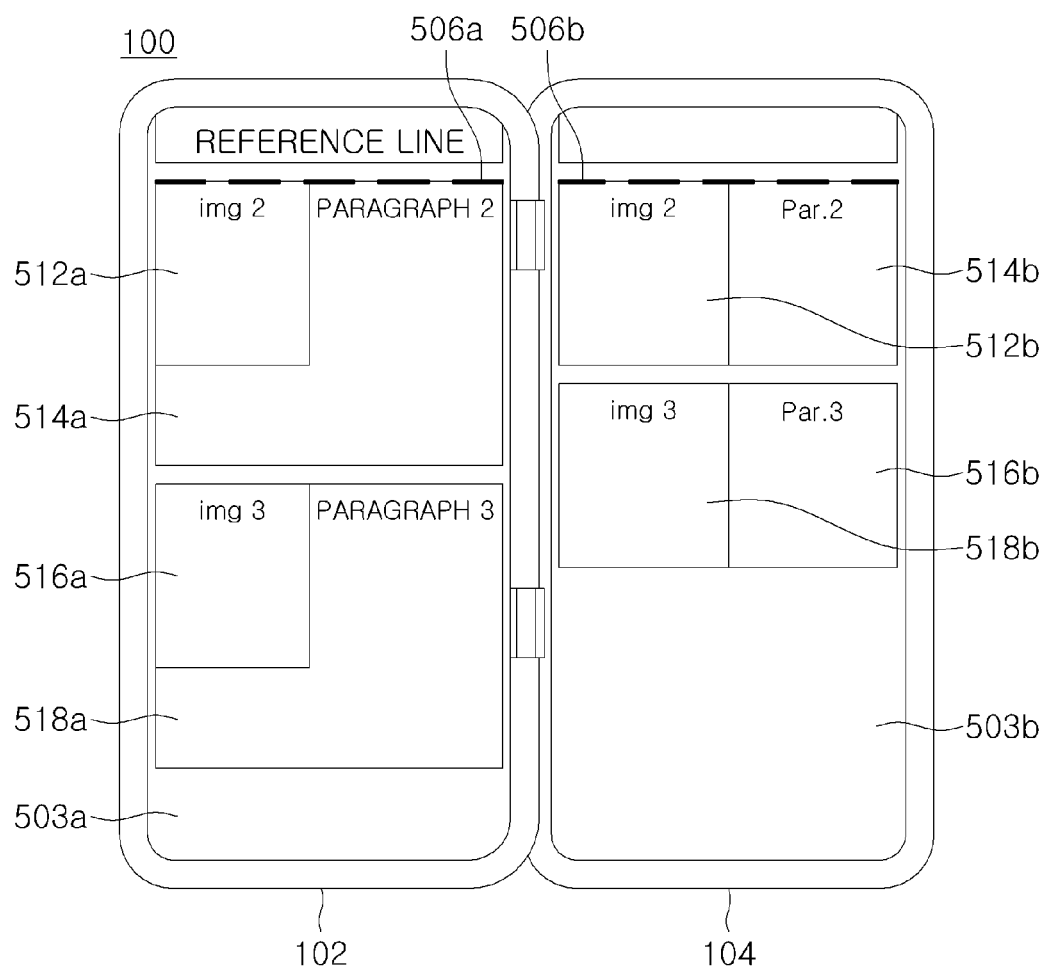
Figure 6:
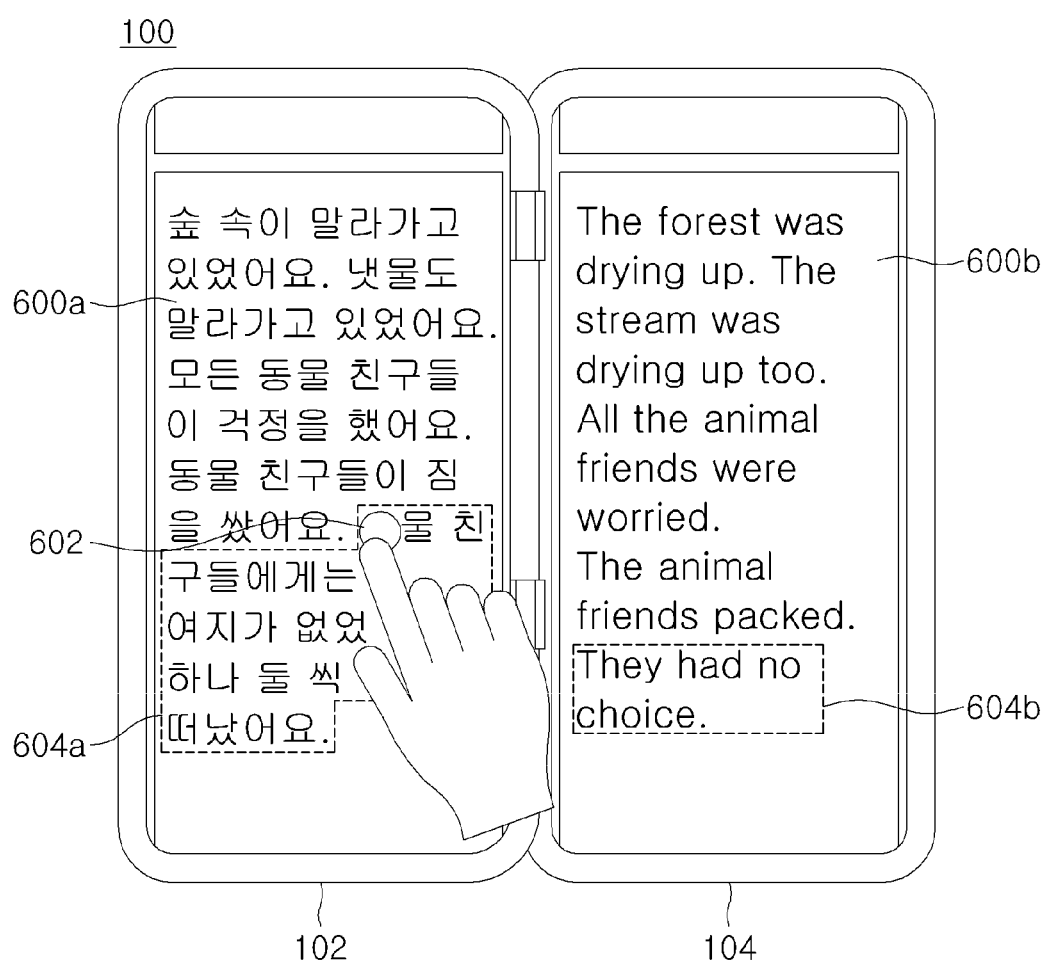
Figure 7:
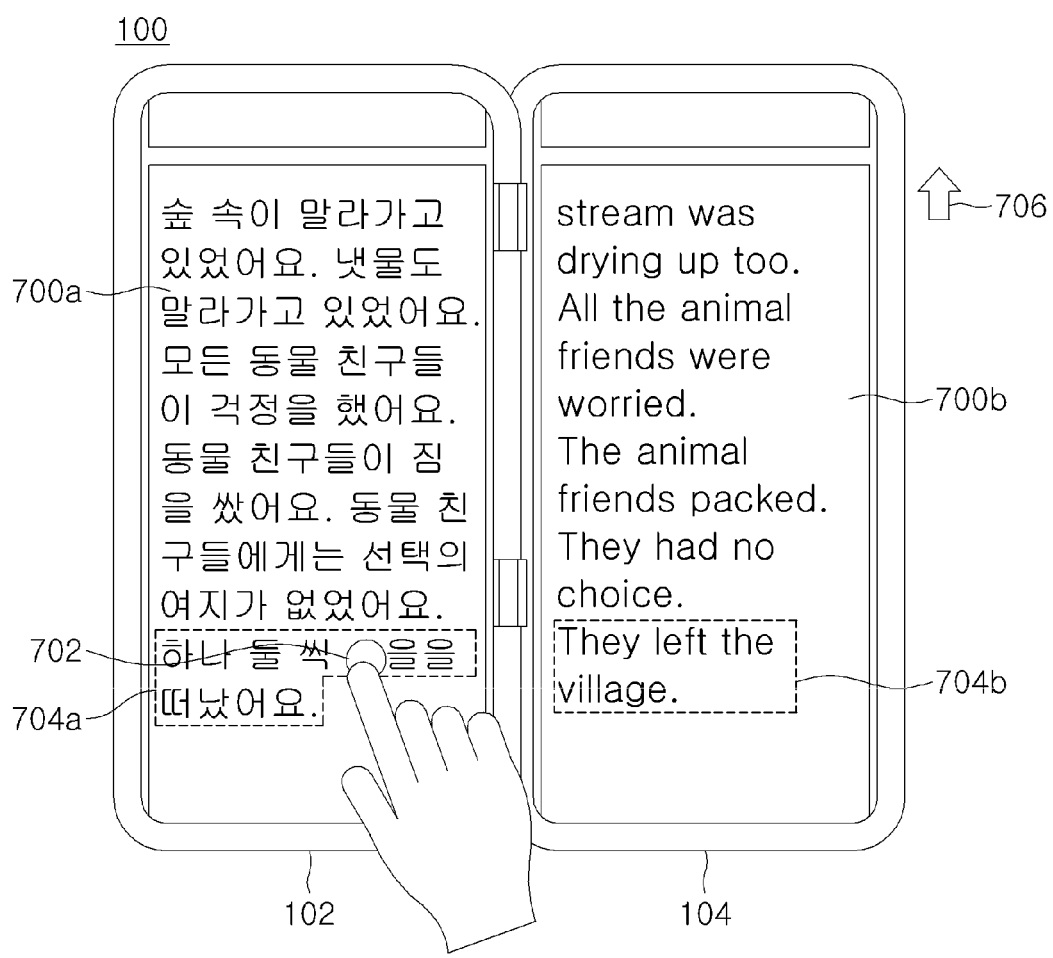

Meanwhile, in FIGS. 5 to 7, the first input unit 306a and the first display 102 are configured together as a touch screen panel, and the second input unit 306b and the second display 104 are also configured together as a touch screen panel.

Referring to FIG. 5A, it is assumed that the original text is displayed on the first display 102 and the translation is displayed on the second display 104.

Next, in step S422, when the original text displayed on the first display 102 is scrolled by a drag operation of a user, the processor 300 allows the translation displayed on the second display 104 to be automatically scrolled and controls each of a scrolling speed of the original text and the scrolling speed of the translation to synchronize the display positions of the original text displayed on the first display 102 and the translation corresponding thereto, which is displayed on the second display 104 with each other. As a result, elements (paragraph, sentence, image, etc.) of the original text and the elements (paragraph, sentence, image, etc.) of the translation corresponding to the original text are substantially disposed respectively at the same positions in the first display 102 and the second display 104, and as a result, the user may easily compare the original text and the translation.

When the translation displayed on the second display 104 is scrolled by a drag operation of the user, the processor 300 allows the original text displayed on the first display 102 to be also automatically scrolled and controls each of the scrolling speed of the translation and the scrolling speed of the original text to synchronize the display positions of the translation displayed on the second display 104 and the original text corresponding thereto, which is displayed on the first display 102, with each other. As a result, elements (paragraph, sentence, image, etc.) of the translation and the elements (paragraph, sentence, image, etc.) of the original text corresponding to the translation are substantially disposed at the same relative position in the second display 104 and the first display 102. As a result, the user may easily compare the translation and the original text.

In an automatic scroll control method for synchronizing the positions of the original text and the translation according to an exemplary embodiment of the present invention, a reference point is derived based on the elements (paragraph, sentence, image, etc.) of the original text and the elements (paragraph, sentence, image, etc.) of the translation in a page displayed on a screen of the display, and the scroll speed of each of the original text and the translation is controlled based on the derived reference point. The elements (paragraph, sentence, image, etc.) of the original text and the elements (paragraph, sentence, image, etc.) of the translation are objects of which each position may be identified on the screen displayed on the display, and as a result, the scroll speed of each of the original text and the translation may be controlled by using the reference point in an exemplary embodiment of the present invention.

Figure 4B:
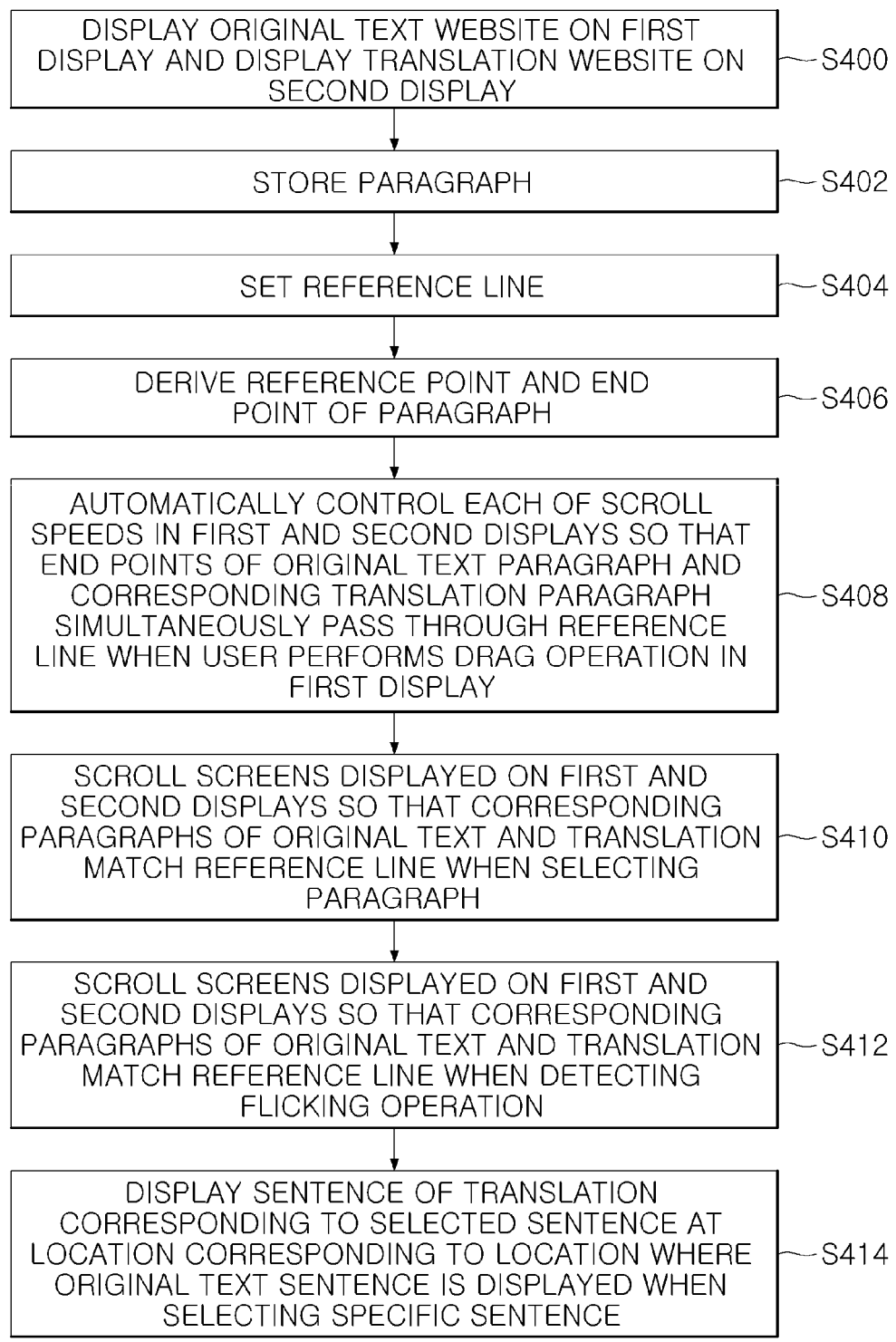
FIG. 4B is a detailed flowchart of an automatic scroll control method for synchronizing positions of an original text and a translation according to an exemplary embodiment of the present invention.

Referring to FIG. 4B, an automatic scroll control method for synchronizing positions of an original text and a translation according to an exemplary embodiment of the present invention will be described in detail.

In step S400, the processor 300 of the terminal device 100 displays an original text on the first display 102 and displays a translation corresponding to the original text on the second display 104. Referring to FIG. 5A, the original text is displayed on the first display 102 and the translation is displayed on the second display 104.

In step S402, the processor 300 stores the paragraphs of the translation corresponding to the paragraphs of the original text in a paragraph storage unit 322.

In step S404, the processor 300 sets reference lines 506a and 506b at a predetermined position of the first display 102 and a predetermined position of the second display 104 as illustrated in FIG. 5A. Since the reference lines 506a and 506b become references at which start points of the original text and the translation are to be located, respectively, the position of the reference line set in the first display 102 and the position of the reference line set in the second display 104 are set so that the reference lines 506a and 506b are located to correspond to each other (i.e., located at the same position (height) in their respective displays 102, 104) in order to synchronize the positions of the original text and the translation.

In an exemplary embodiment of the present invention, the positions of the reference lines 506a and 506b are provided at upper positions of the displays 102 and 104, but the present invention is not limited thereto and the positions at which the reference lines 506a and 506b are set may also be at any positions of the displays 102 and 104 as long as the user is able to conveniently view the paragraphs of the original text and the translation.

In step S406, the processor 300 derives or determines reference points and end points of paragraphs 510a and 514a of the original text and paragraphs 510b and 514b of a translation corresponding to the original text. The reference points of the paragraphs 510a, 514a, 510b, and 514b include the start point at which each paragraph starts and the end point is the end point at which each paragraph ends.

In step S408, when the original text or the translation is scrolled by the drag operation of the user, the processor 300 synchronizes the display positions of the original text and the translation with each other.

That is, when the user performs the drag operation in the first display 102, the original text displayed on the first display 102 is scrolled and the translation displayed on the second display 104, without the drag operation of the user, is also automatically scrolled. By controlling each of the scroll speed of the first display 102 and the scroll speed of the second display 104 so that the end points of the paragraph 510a of the original text and the paragraph 510b of the corresponding translation pass the reference lines 506a and 506b together, and so that the end points of the paragraph 514a of the original text and the paragraph 514b of the corresponding translation pass the reference lines 506a and 506b together, the display positions of the original text and the translation are synchronized with each other to scroll the paragraphs 510a and 514a of the original text and the paragraphs 510b and 514b of the corresponding translation while maintaining the positions relative to each other. As a result, the user may easily compare the paragraphs 510a and 514a of the original text and the paragraphs 510b and 514b of the translation corresponding to the original text with the same visual.

At the time of controlling the scroll speeds of the original text and the translation in synchronizing the display positions of the original text and the translation with each other, it is preferable that a scroll operation by the user is input in one of the first display 102 and the second display 104 and a scroll operation of automatically controlling the scroll speed of the other display is performed.

In synchronizing the display positions of the original text and the translation with each other, each of the scroll speeds of the original text and the translation is controlled based on a first reference point and a final end point of a predetermined number of paragraphs or the length of the paragraph so that final end points of a predetermined number of paragraphs of the original text and a predetermined number of paragraphs of the corresponding translation simultaneously pass through the reference lines 506a and 506b to synchronize the display positions of the original text and the translation.

The processor 300 derives the reference point and the end point of each of images 508a and 512a additionally included in the original text, and images 508b and 512b included in the translation corresponding to the original text, and controls each of the scroll speeds of the original text and the translation based on the reference point and the end point so that the end points of the images 508a included in the original text and the images 508b included in the corresponding translation simultaneously pass through the reference lines 506a and 506b, and the end points of the images 512a included in the original text and the images 512b included in the corresponding translation simultaneously pass through the reference lines 506a and 506b, to synchronize the display positions of the original text and the translation with each other. In an exemplary embodiment of the present invention, the reference points of the images 508a, 512a, 508b, and 512b are start points of the images.

In step S410, when a specific paragraph of the original text or the translation is selected by the user, the processor 300 automatically scrolls the original text and the translation so that the start points of the corresponding paragraphs of the original text and the translation respectively match, i.e., align with, the reference lines 506a and 506b.

Referring to FIG. 5A, when the user selects the first paragraph 510a of the original text displayed on the first display 102, the original text and the translation are automatically scrolled so that the start points of the paragraph 510a of the original text and the paragraph 510b of the translation corresponding thereto match the reference lines 506a and 506b, respectively.

In the state of the first and second displays 102, 104 as shown in FIG. 5A, if the user selects a second paragraph 514b of the translation displayed on the second display 104, a second screen 503b displaying the translation and a first screen 503a of the first display 102 displaying the original text are automatically scrolled so that the start points of the second paragraph 514b of the translation and the paragraph 514a of the original text corresponding thereto match the reference lines 506b and 506a, respectively, and as a result, the state of the first and second displays 102, 104 shown in FIG. 5A becomes the state shown in FIG. 5B.

As such, since the user may dispose a specific paragraph of the original text and the specific paragraph of the translation corresponding thereto together on the reference lines 506a and 506b, the user may quickly and easily compare the original text and the translation of a desired paragraph.

In step S412, at the time of detecting a flicking operation of the user, the processor 300 automatically scrolls the original text and the translation so that the start points of the corresponding paragraphs of the original text and the translation match the reference lines 506a and 506b.

In the state of the first and second displays 102, 104 as shown in FIG. 5A, when the user performs a flicking operation in the first display 102, the original text and the translation are automatically scrolled so that the start points of a paragraph 514a of the original text below the paragraph 510a spanning the reference line 506a and a paragraph 514b of the translation corresponding thereto match the reference lines 506a and 506b, respectively, and as a result, the state of the first and second displays 102, 104 shown in FIG. 5A becomes the state of FIG. 5B.

In the state of FIG. 5A, when the user performs the flicking operation in the second display 104, the original text and the translation are automatically scrolled so that start points of the paragraph 514b of the translation below the paragraph 510b spanning the reference line 506b and the paragraph 514a of the original text corresponding thereto match the reference lines 506b and 506a, respectively, and as a result, the state of FIG. 5A will become the state as shown in FIG. 5B.

Additionally, the processor 300 may automatically scroll the original text and the translation so that the start points of the image 512a included in the original text and the image 512b included in the translation corresponding thereto match the reference line when detecting the flicking operation of the user.

In step S414, when a specific sentence of the original text or the translation is selected by the user, the processor 300 synchronizes display positions of the sentence selected based on the start point of each paragraph and the corresponding sentence with each other.

Referring to FIG. 6, when the user touches a predetermined position 602 of the first display 102 to select a specific sentence 604a among sentences of the original text displayed on the first display 102, the positions of the selected sentence 604a of the original text and the sentence 604b of the translation corresponding thereto are synchronized with each other so that the selected sentence 604a and the sentence 604b of the translation are displayed simultaneously on their respective first and second displays 102, 104.

When the length of the translation is longer than the length of the original text, and the sentence of the translation corresponding to the sentence of the original text selected by the user is not displayed on second display 104, the translation displayed in the second display 104 is automatically scrolled as indicated by an arrow 706 so that a sentence 704b of the translation corresponding to a sentence 704a selected by the user in an original text 700a displayed on the first display 102 is displayed on the second display 104 as illustrated in FIG. 7.

When the length of the original text is longer than the length of the translation, and the sentence of the original text corresponding to the sentence of the translation selected by the user is not displayed on first display 102, the original text displayed on the first display 102 is automatically scrolled so that the sentence of the original text corresponding to the sentence selected by the user in the translation displayed on the second display 104 is displayed on the first display 102.

To synchronize the display positions of the selected sentence and the corresponding sentence with each other, when the user selects a specific sentence of the original text or the translation, the processor 300 may determine the location of the selected sentence in a paragraph. The location of the selected sentence may be specified by counting the number of sentences from the starting point of the paragraph. Here, each sentences in the paragraph may be distinguished based on the sentence symbols such as a punctuation mark, a question mark, or an exclamation mark. Then, the processor 300 specifies the location of the corresponding sentence of the selected sentence by counting the number of sentences from the starting point of the corresponding paragraph, and synchronizes the display location of the selected sentence and the corresponding sentence with each other.

Figure 8:
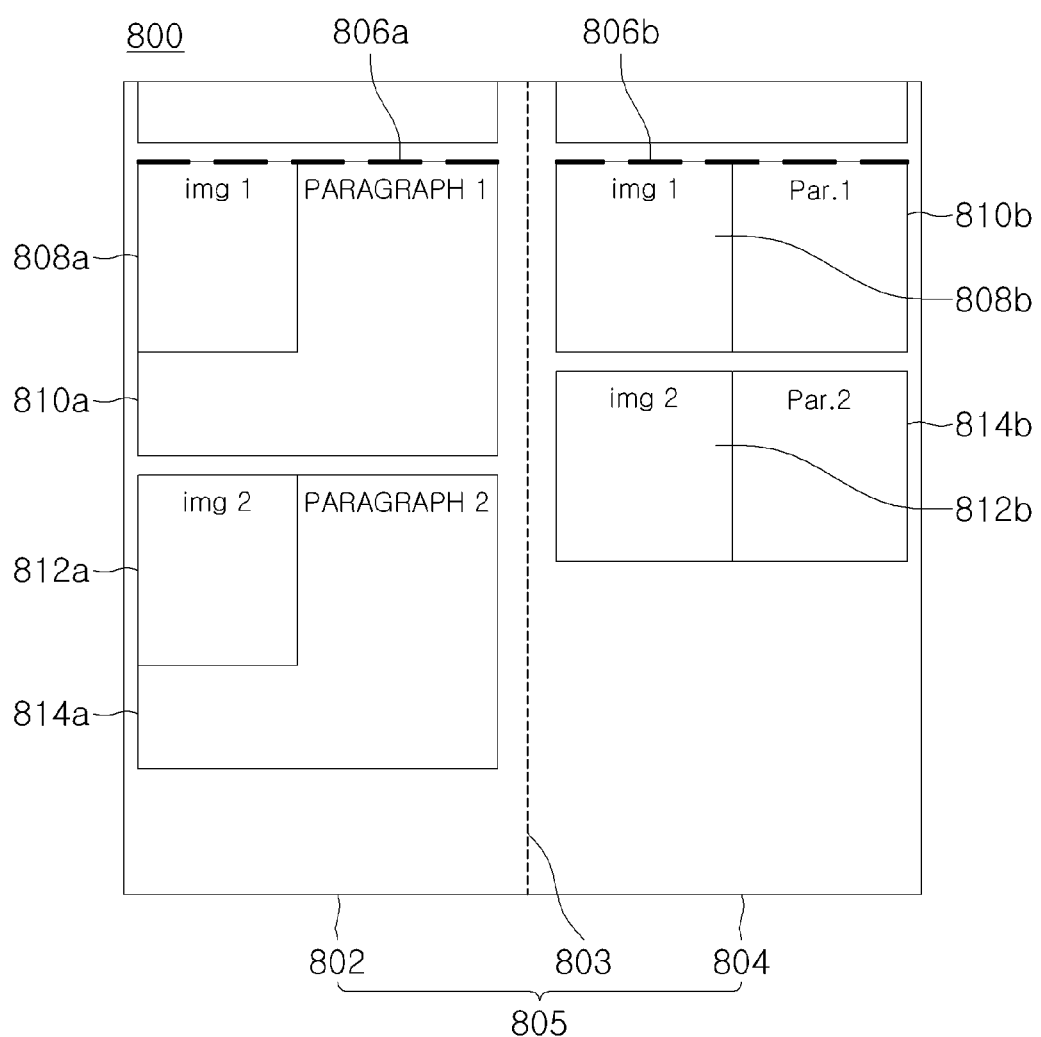
FIG. 8 is a diagram illustrating a foldable terminal device in which an automatic scroll control method for synchronizing positions of an original text and a translation is performed according to an exemplary embodiment of the present invention.

As described above, an automatic scroll control method for synchronizing the positions of an original text and its translation, according to an exemplary embodiment of the present invention, is performed by a terminal device 100 having a dual display. However, the present invention is not limited thereto and as illustrated in FIG. 8, an exemplary embodiment of the present invention may be performed by a foldable terminal device 800 configured by one display 805 in which the first display 102 and the second display 104 are integrated. When the one integrated display 805 is split into two screens, i.e., a first screen 802 and a second screen 804 by a virtual line 803, the first display 102 corresponds to the first screen 802 and the second display 104 corresponds to the second screen 804.

The present invention described above can be embodied as computer readable codes recorded on a non-transitory computer readable recording medium. The computer readable recording medium may continuously store computer executable programs or temporarily store the computer executable programs for execution or download. Further, the medium may be various recording means or storage means of a type in which single hardware or several hardware is coupled, and are not limited to a medium directly connected to any computer system and may also be distributed on a network. Examples of the computer readable medium may include magnetic media such as hard disks, floppy disks, and magnetic tapes, optical recording media such as CD-ROM and DVD, magneto-optical media such as floptical disks, ROM, RAM, and flash memories and may be configured to store program commands. Further, examples of other media may also include recording media or storage media managed in app stores for distributing applications, or sites and servers for supplying and distributing other various software. Accordingly, the aforementioned detailed description should not be construed as restrictive in all terms and should be considered to be exemplary. The scope of the present disclosure should be determined by rational construing of the appended claims and all modifications within an equivalent scope of the present disclosure are included in the scope of the present invention.

The present invention is not limited by the aforementioned embodiments and the accompanying drawings. It will be apparent to those skilled in the art that components according to the present invention may be substituted, modified, and changed within the scope without departing from the technical scope of the present invention.

What is claimed is:

1. An automatic scroll control method for scrolling an original text and a translation, the method comprising:
    displaying, by a processor of a terminal device, an original text on a first display and displaying a translation corresponding to the original text on a second display;
    setting a reference line of the first display and a reference line of the second display to be located to correspond to the original text;
    deriving a reference point and an end point of each paragraph of the original text and the translation corresponding to the original text; and
    when the original text or the translation is scrolled by a drag operation of a user, synchronizing, by the processor, display positions of the original text and the translation such that the display positions of the original text on the first display and the translation on the second display are laterally aligned with each other, by controlling a scroll speed of the original text and the scroll speed of the translation,
    wherein the display positions of the original text and the translation are synchronized with each other by controlling each of the scroll speeds of the original text and the translation so that the end points of the paragraph of the original text and the paragraph of the corresponding translation simultaneously pass through the reference line.

2. The automatic scroll control method of claim 1, wherein at the time of controlling the scroll speeds of the original text and the translation, a scroll operation by the user is input into one of the first display and the second display and a scroll operation of automatically controlling the scroll speed of the other display is performed.

3. An automatic scroll control method for scrolling an original text and a translation, the method comprising:
    displaying, by a processor of a terminal device, an original text on a first display and displaying a translation corresponding to the original text on a second display;
    setting a reference line of the first display and a reference line of the second display to be located to correspond to each other; and
    deriving the reference point and the end point of each of an image included in the original text and the image included in the translation corresponding to the original text,
    when the original text or the translation is scrolled by a drag operation of a user, synchronizing, by the processor, display positions of the original text and the translation such that the display positions of the original text on the first display and the translation on the second display are laterally aligned with each other, by controlling a scroll speed of the original text and the scroll speed of the translation,
    wherein the display positions of the original text and the translation are synchronized with each other by controlling each of the scroll speeds of the original text and the translation so that the end points of the image of the original text and the image of the corresponding translation simultaneously pass through the reference line.

4. The automatic scroll control method of claim 1, further comprising:
    after the deriving of the reference point and the end point of each paragraph of the original text and the translation corresponding to the original text, when a specific paragraph of the original text or the translation is selected by the user, scrolling the original text and the translation so that start points of the corresponding paragraphs of the original text and the translation match the reference line.

5. An automatic scroll control method for scrolling an original text and a translation, the method comprising:
    displaying, by a processor of a terminal device, an original text on a first display and displaying a translation corresponding to the original text on a second display;
    setting a reference line of the first display and a reference line of the second display to be located to correspond to each other; and
    deriving a reference point and an end point of each paragraph of the original text and the translation corresponding to the original text,
    scrolling the original text and the translation so that start points of the corresponding paragraphs of the original text and the translation match the reference line at the time of detecting a flicking operation of the user; and
    when the original text or the translation is scrolled by a drag operation of a user, synchronizing, by the processor, display positions of the original text and the translation by controlling a scroll speed of the original text and the scroll speed of the translation,
    wherein the display positions of the original text and the translation are synchronized with each other by controlling each of the scroll speeds of the original text and the translation so that the end points of the paragraph of the original text and the paragraph of the corresponding translation simultaneously pass through the reference line.

6. An automatic scroll control method for scrolling an original text and a translation, the method comprising:
    displaying, by a processor of a terminal device, an original text on a first display and displaying a translation corresponding to the original text on a second display;
    setting a reference line of the first display and a reference line of the second display to be located to correspond to each other;
    deriving a reference point and an end point of each of an image included in the original text and an image included in the translation corresponding to the original text, scrolling the original text and the translation so that a start point of the image included in the original text and the image included in the translation corresponding to the original text match the reference line at the time of detecting the flicking operation of the user; and when the original text or the translation is scrolled by a drag operation of a user, synchronizing, by the processor, display positions of the original text and the translation by controlling a scroll speed of the original text and the scroll speed of the translation, wherein the display positions of the original text and the translation are synchronized with each other by controlling each of the scroll speeds of the original text and the translation so that the end points of the image of the original text and the image of the corresponding translation simultaneously pass through the reference line.

7. The automatic scroll control method of claim 1, further comprising:

after the deriving of the reference point and the end point of each paragraph of the original text and the translation corresponding to the original text, when a specific sentence of the original text or the translation is selected by the user, synchronizing the display positions of the selected sentence and the corresponding sentence based on the start point of each paragraph.

8. The automatic scroll control method of claim 6, wherein when a specific sentence of the original text or the translation is selected by the user and the sentence corresponding to the selected sentence is not displayed on the first display or the second display, display positions of the selected sentence and the corresponding sentence are synchronized based on the start point of each paragraph so that the sentence corresponding to the selected sentence is displayed.

9. The automatic scroll control method of claim 6, wherein in the synchronizing of the display positions of the selected sentence and the corresponding sentence, when user selects a specific sentence of the original text or the translation, display positions of the selected sentence and the corresponding sentence are synchronized by determining a location of the selected sentence, wherein the location of the selected sentence is specified by counting the number of sentences from the start point of each paragraph, and wherein each sentences in the paragraph are distinguished based on sentence symbols.

10. The automatic scroll control method of claim 1, wherein in the synchronizing display positions of the original text and the translation, each of the scroll speeds of the original text and the translation is controlled based on a first reference point and a final end point of a predetermined number of paragraphs or a length of the predetermined number of paragraphs so that final end points of the predetermined number of paragraphs of the original text and a predetermined number of paragraphs of the corresponding translation simultaneously pass through the reference lines to synchronize the display positions of the original text and the translation.

11. The automatic scroll control method of claim 1, wherein the original text includes a website and the translation includes the website translated into another language by a translation function of a web browser.

12. A non-transitory computer readable recording medium storing a program that, when executed by a processor, causes the processor to perform the automatic scroll control method of claim 1.

13. A terminal device comprising:

a display control unit displaying an original text on a first display and displaying a translation corresponding to the original text on a second display;

a reference line setting unit setting a reference line of the first display and a reference line of the second display to be located to correspond to each other;

a reference point derivation unit deriving a reference point of each paragraph of the original text and the translation corresponding to the original text;

an end point derivation unit deriving an end point of each paragraph of the original text and the translation corresponding to the original text; and a scroll synchronization unit synchronizing display positions of the original text and the translation when the original text or the translation is scrolled by a drag operation of a user such that the display positions of the original text on the first display and the translation on the second display are laterally aligned with each other, by controlling a scroll speed of the original text and the scroll speed of the translation, wherein a scroll synchronization unit controlling each of the scroll speeds of the original text and the translation so that the end points of the paragraph of the original text and the paragraph of the corresponding translation simultaneously pass through the reference line.

* * * * *